April 28, 1925.

L. C. REESE 1,535,545

COLLECTING DEVICE

Filed Sept. 6, 1924

INVENTOR
LOUIS CHARLES REESE
BY
ATTORNEYS

April 28, 1925.

L. C. REESE 1,535,545

COLLECTING DEVICE

Filed Sept. 6, 1924     4 Sheets-Sheet 2

INVENTOR
LOUIS CHARLES REESE

BY
ATTORNEY

April 28, 1925.
L. C. REESE
COLLECTING DEVICE
Filed Sept. 6, 1924
1,535,545
4 Sheets-Sheet 3
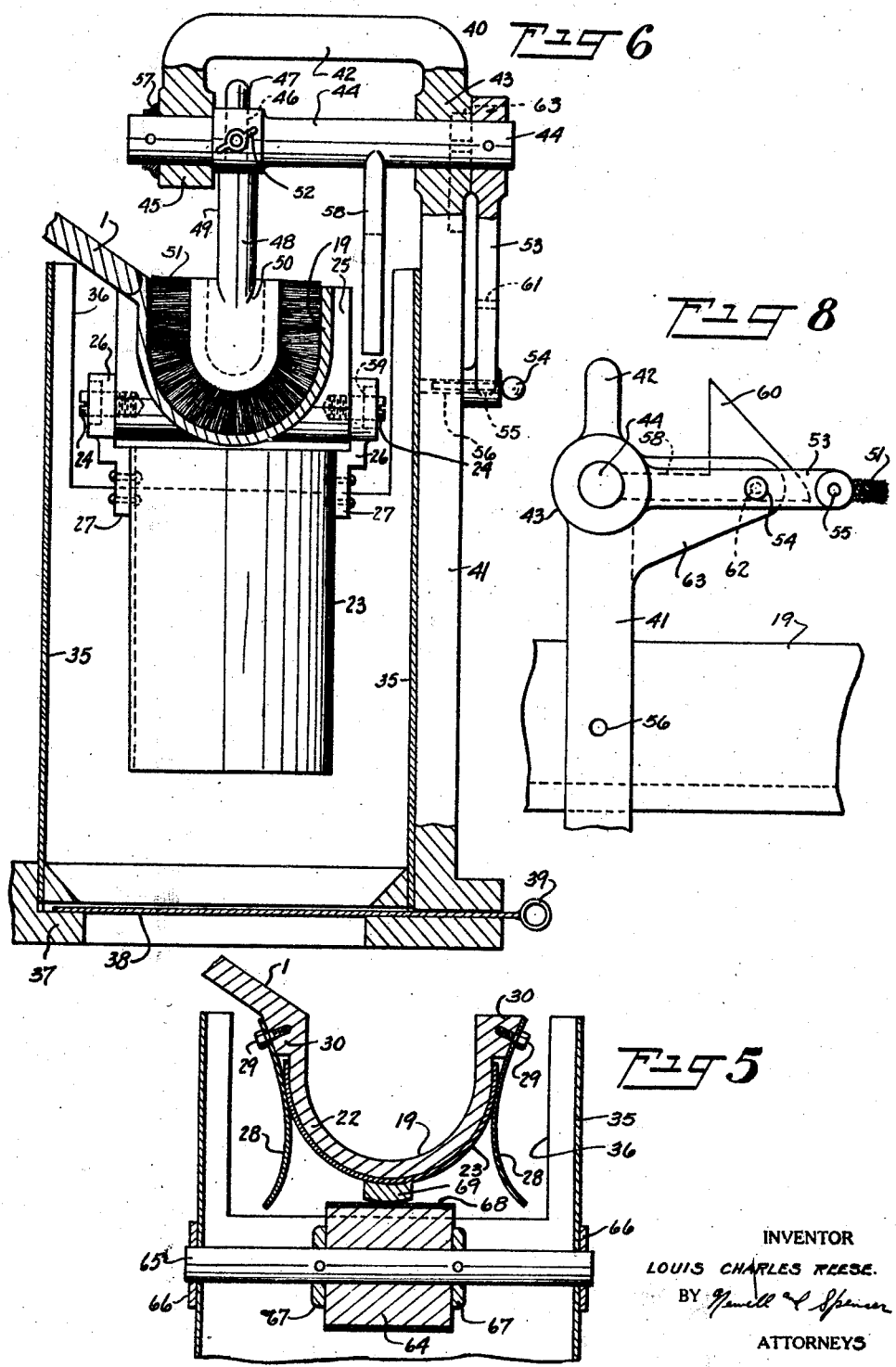
INVENTOR
LOUIS CHARLES REESE.
BY
ATTORNEYS

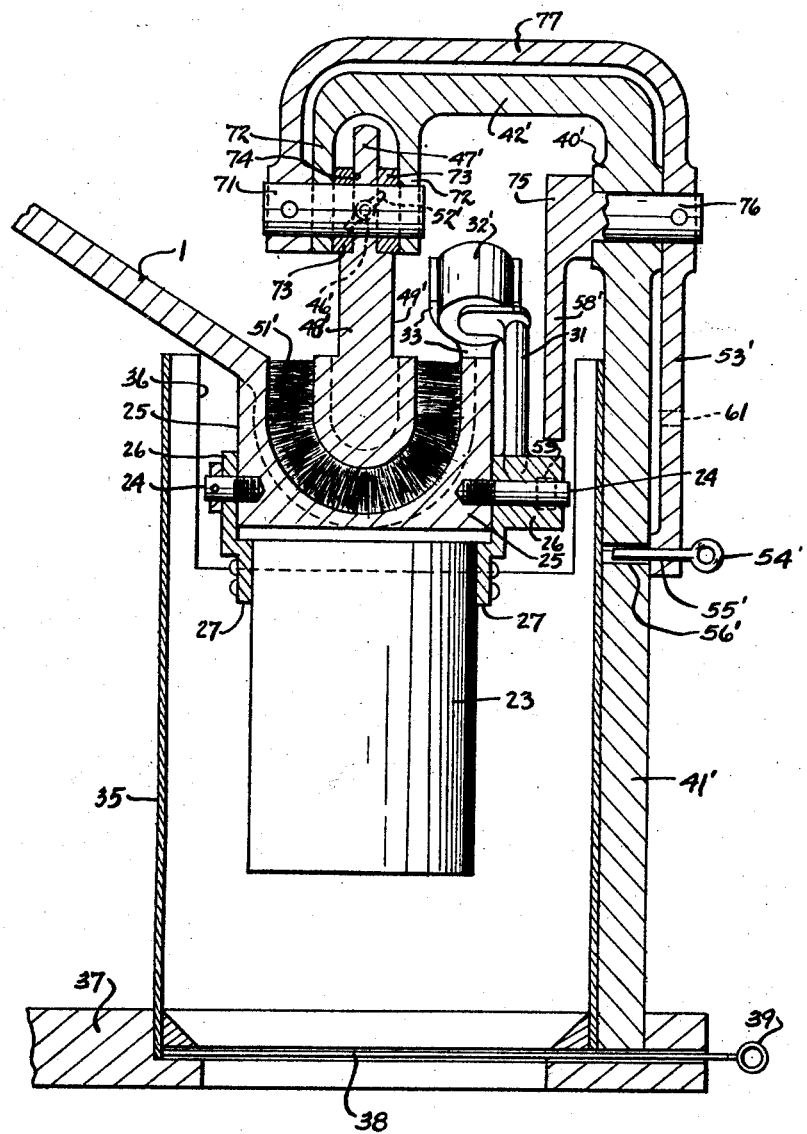

Patented Apr. 28, 1925.

1,535,545

UNITED STATES PATENT OFFICE.

LOUIS CHARLES REESE, OF SAGINAW, MICHIGAN, ASSIGNOR TO BAKER-PERKINS COMPANY, INCORPORATED, OF WHITE PLAINS, NEW YORK.

COLLECTING DEVICE.

Application filed September 6, 1924. Serial No. 736,243.

*To all whom it may concern:*

Be it known that I, LOUIS CHARLES REESE, residing at Saginaw, Michigan, have invented a certain new and useful Improvement in Collecting Devices, of which the following is a clear, full, and exact description.

This invention relates to devices for collecting and conserving materials which might otherwise be wasted in manufacturing operations, and is herein shown as embodied in a device for collecting flour or other material that falls from the rotating table of a dough-molding machine of the type in which the dough pieces are molded into shape by being passed between a revolving table and a stationary trough arranged spirally about the active surface of the latter. It will be understood, however, that the invention is not restricted to the illustrated embodiment or uses and that many features of the invention are of general utility.

An object of the invention is to provide a device for collecting and conserving materials, which may be attached to a machine such, for example, as the dough molding machine herein illustrated and which will operate substantially automatically.

A further object of the invention is so to arrange the receiving and gathering elements of the device or its attachments as to take advantage of the movement of parts of the machine with which it is associated.

Among the important features of the invention are the provision of a trough about the edge of said table which is formed integrally with or attached to the table so as to rotate therewith, the provision of a stationary receiving box under a portion of the edge of the table, the provision of a gathering means held by said box and extending into the trough to collect before it the particles of flour or like material dropped by the table into the trough, and the provision of a flap in the trough whereby the material gathered by said means may be emptied into the box, and of means for opening the flap when it is above said box and for closing same before it passes beyond the end of said box.

Other objects and important features of the invention will appear from the following description and claims when considered in connection with the accompanying drawings, in which—

Fig. 3 is a side view of the flap through which the trough is emptied showing a spring means for normally keeping the flap closed;

Fig. 5 is a cross sectional view taken through the lines 5—5 in Fig. 3 and showing the mechanism for closing the flap;

Fig. 6 is a cross sectional view taken through the lines 6—6 in Fig. 3 showing the sweeping mechanism and flap releasing apparatus of Fig. 3 in their active position, the flap having just been released;

Fig. 7 is a cross sectional view taken through the lines 7—7 of Fig. 4, showing the sweeping mechanism and flap releasing apparatus of Fig. 4 in their active position, the flap having just been released; and Fig. 8 is a side view of the trip rod and sweeper, as shown in Figs. 3 and 6, in their inactive position.

Figure 1:
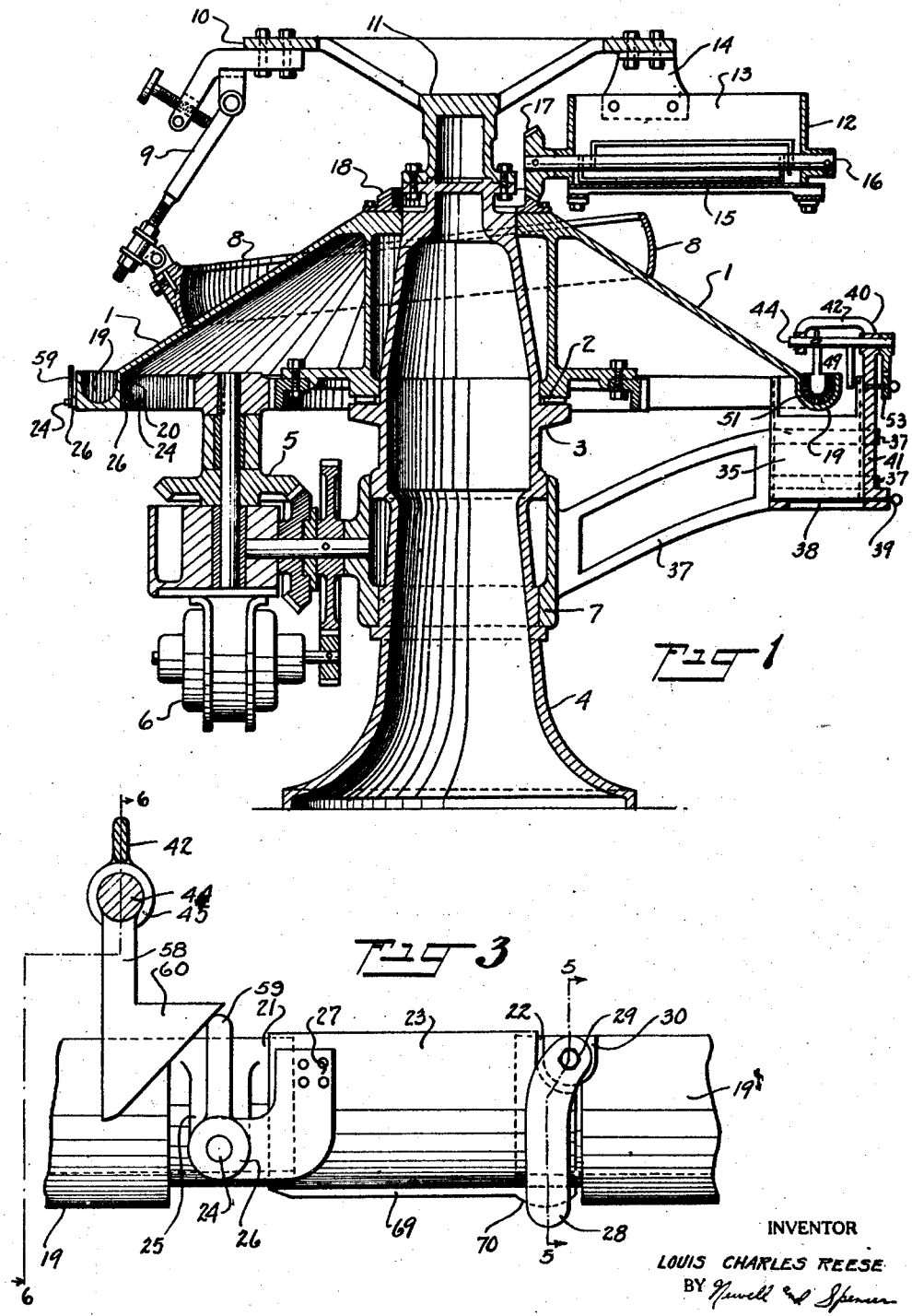
Fig. 1 is a cross sectional side view of a dough molding machine of the type described.
Figure 2:
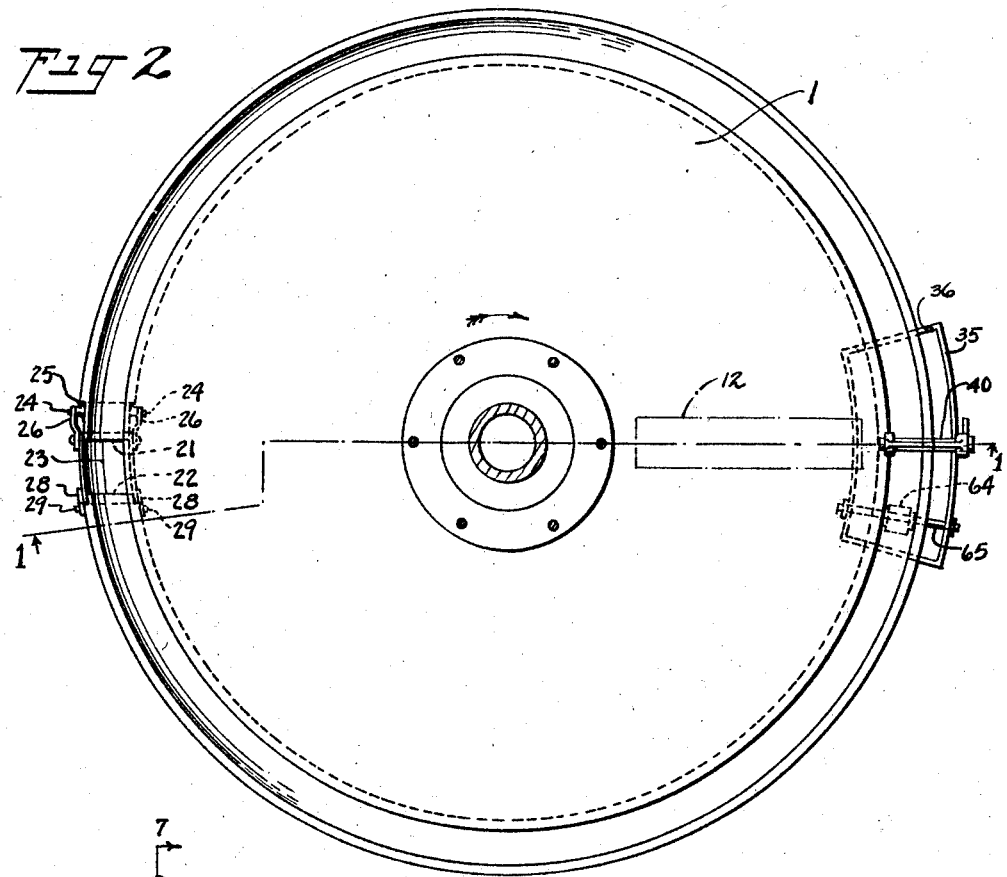
Fig. 2 is a plan view of a table thereof showing the trough and its associated mechanism.

Fig. 1 shows a molding table 1 shaped like a truncated cone and revolubly supported by an annular roller bearing 2 fitting on brackets 3 extending from a column 4 upon which the molding machine rests. The table 1 is rotated by means of a gearing 5 driven by an electric motor 6, the gearing and the motor being carried by an annular bracket 7 upon the column 4. The molding trough 8 which is spirally arranged about the upper surface of table 1 is removably suspended by adjustable links 9 from the rim of a wheel 10 carried by a head block 11 on the top of column 4. Suspended also from the table 10 by a bracket 14 is a flour sprinkler 12 consisting of a flour box 13 having a half cylindrical perforated bottom and of a rod agitator 15 fixed to a shaft 16 provided with a pinion 17 which meshes with an annular toothed ring 18 rigidly mounted on the flat annular top of table 1.

A trough 19 is formed about the rim 20 of the table so as to catch the flour particles thrown therefrom, and is preferably integral therewith. The trough 19 does not completely surround the table but is interrupted between its end 21, and its opposite end 22. Into this interval is inserted a flap 23 shaped similarly to the trough 19. The ends 21 and 22 of the latter, as well as that part of the rim of the table 1 situated between them, are reduced and shaped in such a manner that the flap 23 fits easily and well over the same. Near to the reduced end 21 two screw pins 24 are fixed opposite to each other in the reinforced lower parts 25 of the side walls of the trough 19, their smooth parts protruding from the reinforced parts 25 to serve as trunnions for the hub-like projections 26 of the brackets 27 affixed to the flap 23. The flap 23 normally fills the interval between the ends 21 and 22 of the trough. The arrangement is such that when the flap is not held in position against the end 22 of trough 19, its weight causes it to hang about vertically downwards, as shown in Figs. 6 and 7. The flap is normally retained in its upward position, however, by a pair of springs 28, such as shown in Figs. 3 and 5, or by a counterweight 32 of the sort shown in Figs. 4 and 7, or by some equivalent device.

Figure 4:
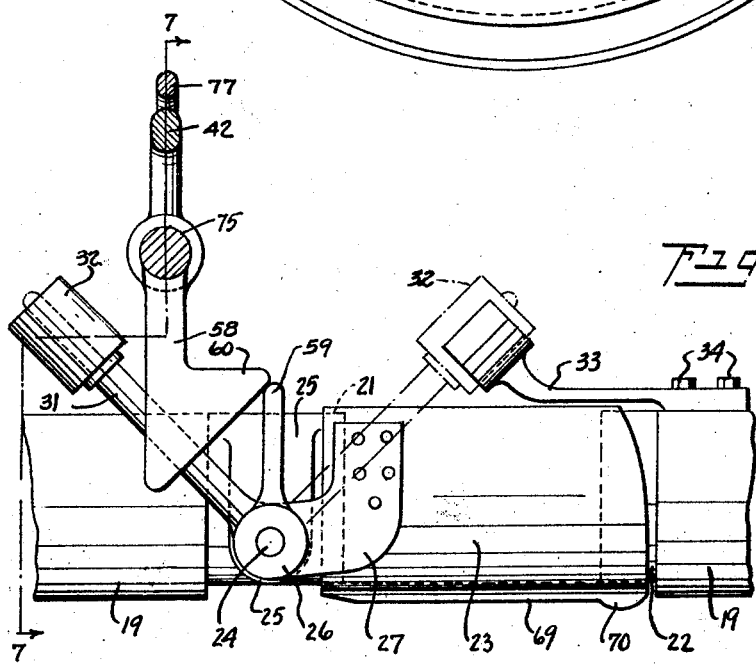
Fig. 4 shows an alternative means for keeping the flap closed.

The springs 28 are fixed opposite each other by means of screws 29 to inclined projections 30 on the upper part of the trough 19 near its end 22, and so arranged that they are capable of firmly retaining the flap 23 in its closed position by their pressure against the sides of the latter; their free lower ends are bent outwards so as to allow free entrance between them of the flap 23 when being raised to this position. The counter weight 32 shown in Fig. 4 is carried by an arm 31 which is rigidly fixed to the hub 26 of the bracket 27 and acts to maintain the free end of the flap pressed against the end 22 of trough 19 when it is positioned as shown in full lines in Fig. 4. When it is thrown over to the position shown by dotted lines, the flap 23 is lowered and points vertically downwards. In order to prevent the flap from swinging over this position there is provided as a stop for the counterweight 32 a bracket 33 fixed by screws 34 to the top of the trough 19 reinforced for this purpose near its end 22.

Below a portion of the trough is a stationary receptacle 35 for receiving the flour collected in the trough. This receptacle is suitably wider than the trough, preferably conforms in outline to the curve of the same, and must be long enough to conveniently allow the opening and closing of flap 23 when it passes through its upper part. It is preferably made so high that its top is about on a level with the trough 19 and its end walls are provided at their upper part with incisions 36 to allow easy passage therethrough of the flap 23 with its pins, springs, or other attachments. The receptacle 35, as shown is carried by a bracket 37 fixed to or integral with the annular bracket 7, but it may be supported by any other stationary means. At the bottom of the receptacle a shutter 38 worked by a handle 39 is provided to drop the flour, after a sufficient quantity has accumulated into a box, trolley, or like device placed underneath it. The support of the receptacle 35 carries at about the middle of its outer side a bracket 40 consisting of an upright 41 and an inverted U-shaped arm 42 which reaches over the top of the trough 19 and carries the sweeping means gathering the flour dropped into the same and the device for releasing the flap 23 from its closed position.

In Fig. 6, which shows this arrangement for the case, in which springs 28 are used for retaining the flap 23 in its raised position, a horizontal bearing 43 is provided in the side of the U attached to the upright 41, and a horizontal bearing 45 is provided in the opposite side of the U. A shaft 44 is rotatably set in these bearings. Between the bearings 43 and 45, above the middle of the trough 19, the shaft 44 is provided with an opening 46 in which is inserted an extension 47 on the handle 48 of a brush 49. This brush has a solid back 50 from which extend bristles 51 adapted to sweep the whole inner surface of the trough 19, so that the flour falling into the latter from the table 1 accumulates before the same over the receptacle 35. The bristles 51 are made to bear more or less closely against the inner surface of the trough by adjusting the extension 47 in the opening 46 by means of a thumb screw 52. The brush is held in a position vertical to the trough by means of an arm 53 rigidly mounted upon the shaft 44 beyond the bearing 43 and by a pin 54 passing through corresponding holes 55 and 56 in the arm 53 and in the upright 41. The shaft 44 is held in position by the arm 53 and by a collar 57 rigidly fixed thereto outside the bearing 45. A trip rod 58 extends downwardly from the shaft 44 near the bearing 43 and outside the trough 19 and like the brush is held stationary by the arm 53. A lever 59 which, when the flap is closed, points vertically upwards in line with the trip rod 58 is affixed to the hub 26 of the bracket 27 carrying flap 23. The relative positions and lengths of the rod 58 and the lever 59 are such that as the table 1 revolves the lever will strike against the trip rod 58 and will be turned thereby so that the flap 23 will be forced downwardly and will be released from the pressure of the spring or the counter weight holding it in its closed position. In order to ease this flap opening action, the upper end of the lever 59 may be rounded off and the lower part of the rod 58 may be provided with a triangular projection 60 extending toward the lever 59 in such a manner that the top of the latter glides gradually along one edge of the triangular projection 60. As the free end of the flap 23 turns downward, the flour which has been collected therein by the brush 49 will drop into the receptacle 35.

The brush 49 and the trip rod 58 are put out of action by removing the pin 54 from the holes 55 and 56 and placing it through a hole 61 in the arm 53 and into a hole 62 provided in a bracket 63 in the upper part of the upright 41, as shown in Fig. 8. The flap 23 will then remain closed and the flour dropping from the table 1 will collect at the bottom of the trough 19 and its flap 23 until the brush 49 and trip rod 58 are again made active.

After the flap 23 has emptied itself, it is automatically closed by means of a roller 64 which is revolubly mounted on a shaft 65 and fastened to flanges 66 in the side walls of the receptacle 35 and positioned in the path of the flap 23 so as to press it upwards into place as the flap passes over it. It is kept in position by collars 67 rigidly fixed to the shaft 65. In order to diminish the noise of the action and to soften the fierceness of the contact when the flap 23 strikes the roller 64, the surface of the roller is preferably covered with rubber 68 or other resilient material. To increase the strength of the flap its bottom is preferably provided along its whole length where it touches the roller 64 with a strip of metal 69, which is provided at its free end with a knob 70 for driving the flap home into its closed position.

In order to give the sweeping device and the trip rod ample strength to resist any obstacle they may encounter, and to the counterweight, if such is used for keeping the flap 23 closed, a sufficiently wide swing, each of the first named two devices is affixed to a separate shaft, the two shafts being carried by opposite parts of the bracket 40', and ample room between their two ends being left for the movement therethrough of the counterweight. The brush 49' (Fig. 7) is adjustably fixed (like in Fig. 6) to the short shaft 71 revolubly carried in bearings arranged in the two opposite leaves of the fork-shaped branch 72 of the inverted U-like arm 42' of the bracket 40'. The shaft 71 is surrounded by the collar 73 fitting between the two leaves of the branch 72; and provided with an opening 46' corresponding to the similar openings 74 in the collar 73. The extension 47' of the brush handle 48' is inserted in these openings when aligned and held therein by the thumb screw 52', which thus serves at the same time for keeping the shaft 71 in position and for adjusting the bristles 51' of the brush 49' in regard to the trough 19 which they have to sweep. The trip rod 58' is fixed to or forms part of the reinforced end 75 of the short shaft 76 turning coaxially to the shaft 71 in a bearing provided in the side of the U attached to the upright 41' and is held stationary by means of the arm 53' rigidly fixed to the shaft 76, which is kept in position by its reinforced part 75 and the arm 53'. The latter carries affixed at its upper end or is integral with the bow 77 arranged above and about parallel to the U 42' of the bracket 40'. The free end of the bow 77 is fixed to the shaft 71 in such a manner that the brush 49' and the trip rod 58' are in their active position, when, as before described, a pin 54' is placed through the hole 55' in the arm 53' and the hole 56' in the upright 41'. The free space between the ends facing each other of the shaft 71 and the reinforced part 75 of the shaft 76 is ample for the counterweight 32' to pass through at any position it may have.

I claim—

1. In combination, a rotatable table, a device rotatable with the table for collecting the droppings therefrom, and means for removing said droppings from said device.

2. In combination, a rotatable table, a trough rotating with the table and positioned along the edge thereof, a hinged flap in the trough, and means to normally hold the flap against the trough.

3. In combination, a rotatable table, a trough about the edge thereof and rotating therewith, a normally closed flap in the trough, means to open the flap, and means to close the flap.

4. In combination, a rotatable table, a trough about the edge thereof and rotating therewith, a hinged flap in the trough, means to maintain the flap normally alined with the trough, means to cause the flap to drop, and means to return the flap to its alined position.

5. In combination, a rotatable table, a trough about the edge thereof and rotating therewith, a hinged flap in the trough, means to maintain the flap normally alined with the trough, stationary means to open the flap once in each revolution thereof, and stationary means to close the same.

6. In a machine of the kind described, the combination with a rotatable molding table, of a trough rotating with the table, partially surrounding the edge thereof, and positioned so as to catch the droppings therefrom, of a flap filling the interval between the two ends of the trough and hinged to one end of the same, and of a spring at the other end of the trough to keep the flap in its closed position.

7. In a machine of the kind described, the combination with a rotatable molding table, of a trough rotating with the table, partially surrounding the edge thereof, and positioned so as to catch the droppings therefrom, of a flap normally filling the interval between the two ends of the trough and hinged to one end of the same, and of means to keep the flap normally in its closed position.

8. In a machine of the kind described, the combination with a rotatable molding table, of a trough rotating with the table, partially surrounding the edge thereof, and positioned so as to catch the droppings therefrom, of a flap normally filling the interval between the two ends of the trough and hinged to one end thereof, of means for automatically opening the flap, and of means for automatically closing the flap.

9. In a machine of the kind described, the combination with a rotatable molding table, of a trough rotatable therewith partially surrounding the edge thereof, and positioned so as to catch the droppings therefrom, of a flap adapted to fill the interval between the two ends of the trough and hinged to one end thereof, and of a stationary sweeper adapted to gather at its front the droppings received by the trough.

10. In a machine of the kind described, the combination with a rotatable molding table, a trough rotatable therewith, partially surrounding the edge thereof, and positioned so as to catch the dropping therefrom, of a flap adapted to fill the interval between the two ends of the trough and hinged to one end thereof, of a stationary sweeper adapted to gather at its front the droppings received by the trough, of means for normally maintaining the sweeper in its active position, and of means for removing it from this position.

11. In a machine of the kind described, the combination with a rotatable molding table, of a trough rotatable therewith, partially surrounding the edge thereof, and positioned so as to catch the droppings therefrom, of a flap adapted to fill the interval between the two ends of the trough, of releasable means to keep the flap closed, of a stationary trip rod, and of a lever rod fixed to the hinged end of said flap and positioned so that it will strike the trip rod to open the flap.

12. In a machine of the kind described, the combination with a rotatable molding table, of a trough rotatable therewith, partially surrounding the edge thereof, and positioned so as to catch the droppings therefrom, of a flap adapted to fill the interval between the two ends of the trough and hinged at the end thereof which is first in the direction of rotation, of releasable means for keeping the flap closed, of a revoluble roller, and of a stationary support for the roller so positioned that it will be in the path of the flap when open and will close the same as it passes thereover during its revolution.

13. In a machine of the kind described, the combination with a rotatable molding table, of a trough rotating therewith, partially surrounding the edge thereof, and positioned so as to catch the droppings therefrom, of a flap adapted to fill the interval between the two ends of the trough and hinged at one end thereof, of releasable means to keep the flap closed, of a stationary receptacle suitable for collecting the droppings cast by said table upon said trough and the said flap, of a stationary sweeper above said receptacle adapted to gather at its front the droppings received from the said table by said trough and said flap, of automatic means for opening said flap when it is completely above the receptacle, and of automatic means for closing said flap before it passes beyond the receptacle.

14. In a machine of the kind described, the combination with a rotatable molding table, of a trough rotating therewith, partially surrounding the edge thereof, and positioned so as to catch the droppings therefrom, of a flap adapted to fill the interval between the two ends of the said trough and hinged at that end of the latter which is first in the direction of the rotation of the table, of releasable means for keeping the flap closed, of a lever rod fixed to the hinged end of the flap, of a receptacle suitable for collecting the droppings cast by said table from said trough and said flap, of a stationary support for the receptacle, of a stationary sweeper adapted to gather at its front the droppings contained in said trough and said flap, of a stationary trip rod, of a bracket fixed to said support and comprising a horizontal part reaching across the course of said trough and carrying affixed thereto the sweeper and the trip rod, the bracket being arranged at the side of said receptacle at such a point that when said flap has completely entered above the latter the lever rod will strike against the trip rod to open the flap so that the material on the same before said sweeper will drop into said receptacle, and of a roller carried by a support fixed to the walls of said receptacle at such a point that said flap will strike against the same and will thereby be closed before it passes beyond the receptacle.

Signed at Saginaw, Michigan, this 26th day of August 1924.

LOUIS CHARLES REESE.